United States Patent
Chwioko et al.

(10) Patent No.: US 10,629,181 B2
(45) Date of Patent: Apr. 21, 2020

(54) APPARATUS AND METHOD FOR PRIVACY ENHANCEMENT

(71) Applicant: JAGUAR LAND ROVER LIMITED, Coventry, Warwickshire (GB)

(72) Inventors: Kudzayi Chwioko, Warwickshire (GB); Delphine Nourzad, Warwickshire (GB); Xavier Vinamata, Warwickshire (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 0 days.

(21) Appl. No.: 16/329,497

(22) PCT Filed: Jul. 31, 2017

(86) PCT No.: PCT/EP2017/069324
§ 371 (c)(1),
(2) Date: Feb. 28, 2019

(87) PCT Pub. No.: WO2018/046185
PCT Pub. Date: Mar. 15, 2018

(65) Prior Publication Data
US 2019/0228757 A1 Jul. 25, 2019

(30) Foreign Application Priority Data
Sep. 12, 2016 (GB) .................. 1615424.7

(51) Int. Cl.
*H04R 3/02* (2006.01)
*G10K 11/175* (2006.01)
(Continued)

(52) U.S. Cl.
CPC ........ *G10K 11/175* (2013.01); *G06K 9/00832* (2013.01); *G10L 25/84* (2013.01); *H04R 1/025* (2013.01); *H04R 2499/13* (2013.01)

(58) Field of Classification Search
CPC .. G10K 11/175; G06K 9/00832; G10L 25/84; H04R 1/025
See application file for complete search history.

(56) References Cited

U.S. PATENT DOCUMENTS

| | | | |
|---|---|---|---|
| 7,505,898 B2 | 3/2009 | Hillis et al. | |
| 2010/0158263 A1* | 6/2010 | Katzer | G10K 11/175 381/73.1 |

(Continued)

FOREIGN PATENT DOCUMENTS

| | | |
|---|---|---|
| EP | 2660814 A1 | 11/2013 |
| EP | 3040984 A1 | 7/2016 |
| EP | 3048608 A1 | 7/2016 |

OTHER PUBLICATIONS

Search and Examination Report, GB1615424.7, dated Mar. 9, 2017.
International Search Report and Written Opinion, PCT/EP2017/069324, dated Oct. 18, 2017.

*Primary Examiner* — Simon King
(74) *Attorney, Agent, or Firm* — Miller Nash Graham & Dunn LLP (57) ABSTRACT

Embodiments of the present invention provide an in-vehicle privacy system, comprising audio output means (146, 147) associated with a first zone (110) of an interior of a vehicle (100), audio source means (250) for providing an audio signal (205) to the audio output means (146, 147), speech intelligibility means (310) for estimating a speech intelligibility in the first zone (110), control means arranged to control one or more properties of the audio signal (205) in dependence on the estimate of speech intelligibility to mask speech of a second occupant in a second zone (150) of the interior of the vehicle (100) from a first occupant with the first zone.

17 Claims, 3 Drawing Sheets

(51) Int. Cl.
    *G06K 9/00*     (2006.01)
    *G10L 25/84*     (2013.01)
    *H04R 1/02*     (2006.01)

(56) References Cited

U.S. PATENT DOCUMENTS

| | | | |
|---|---|---|---|
| 2013/0259254 A1* | 10/2013 | Xiang | G10K 11/175 |
| | | | 381/73.1 |
| 2014/0006017 A1* | 1/2014 | Sen | G10L 21/003 |
| | | | 704/208 |
| 2015/0137998 A1* | 5/2015 | Marti | B60Q 9/00 |
| | | | 340/901 |
| 2016/0086602 A1 | 3/2016 | Hwang et al. | |
| 2016/0196818 A1* | 7/2016 | Christoph | H04S 7/301 |
| | | | 381/71.6 |
| 2017/0092298 A1* | 3/2017 | Nakamura | G10L 25/84 |
| 2017/0316773 A1* | 11/2017 | Walther | G10K 11/175 |

\* cited by examiner

APPARATUS AND METHOD FOR PRIVACY ENHANCEMENT

CROSS-REFERENCE TO RELATED APPLICATIONS

This application is a 371 of International Application No. PCT/EP2017/069324, filed Jul. 31, 2017, which claims priority to GB Patent Application 1615424.7, filed Sep. 12, 2016, the contents of both of which are incorporated by reference herein in their entirety.

TECHNICAL FIELD

The present disclosure relates to an apparatus and method and particularly, but not exclusively, to an apparatus and method for enhancing privacy within a vehicle. Aspects of the invention relate to a system, to a controller, to a method, to a vehicle and to computer software.

BACKGROUND

It is sometimes desired to provide privacy between occupants of a vehicle. For example when an occupant of the vehicle wishes to make a telephone call it may be preferred, by that occupant at least, the call be private. Even where the occupant making the call uses headphones or the like, their speech may still be heard by other occupants of the vehicle. It has been known to provide a physical barrier in vehicles, such as between front and rear seat occupants of the vehicle. However this is intrusive and at least partly separates the occupants at all times, even when the barrier may be partly removed, such as lowered. Alternatively a volume of an in-vehicle entertainment system may be increased to obscure the speech, but this may be undesirable for both the occupant making the call and the other occupants.

It is an object of embodiments of the invention to at least mitigate one or more of the problems of the prior art.

SUMMARY OF THE INVENTION

Aspects and embodiments of the invention provide an in-vehicle privacy system, an in-vehicle privacy controller, a method of masking speech in a vehicle, a vehicle and computer software as claimed in the appended claims.

According to an aspect of the present invention, there is provided a system, comprising audio source means for providing an audio signal to an audio output means, speech intelligibility means for estimating speech intelligibility in a first zone of an interior of a vehicle, and control means for controlling one or more properties of the audio signal in dependence the estimate of speech intelligibility. Advantageously the properties or characteristics of the audio are controlled in dependence on the intelligibility of speech for masking the speech.

According to an aspect of the invention, there is provided an in-vehicle privacy system, comprising audio output means associated with a first zone of an interior of a vehicle, audio source means for providing an audio signal to the audio output means, speech intelligibility means for estimating a speech intelligibility in the first zone, control means arranged to control one or more properties of the audio signal in dependence on the estimate of speech intelligibility to mask speech of a second occupant in a second zone of the interior of the vehicle from a first occupant with the first zone. Advantageously the properties or characteristics of the audio signal are controlled in dependence on the intelligibility of speech for masking the speech of the second occupant.

A system as described above, wherein:
the audio output means comprises one or more audio output devices;
the audio source means comprises an audio signal generator device;
the speech intelligibility means comprises a processor arranged to determine the estimate of speech intelligibility; and
the control means comprises a processor arranged to control one or more properties of the audio signal.

The one or more properties of the audio signal may comprise a frequency profile of the audio signal. Advantageously, the frequency profile is used to mask the speech.

Optionally the audio source means comprises a source of noise. Advantageously, the source of noise may be effective at masking the speech. The source of noise may be one of a source of Brownian, white or pink noise. A suitable source of noise to mask the speech may be advantageously used.

The audio source means may comprise a source of audio. Optionally the audio is provided from one of a music source, a radio or a streaming source. Advantageously the audio may be agreeable to a listener.

The speech intelligibility means may be arranged to receive a signal from an audio input means arranged in the first zone and to estimate the speech intelligibility in dependence thereon. Advantageously the speech intelligibility is determined based on audio in the first zone.

The speech intelligibility means is optionally arranged to receive data indicative of one or more parameters of the vehicle and to estimate the speech intelligibility in dependence thereon. Advantageously the one or more parameters are used to estimate the speech intelligibility, which may reduce a complexity of the estimation. The one or more parameters may comprise one or more of vehicle speed, engine speed and motor speed.

Optionally the estimate of speech intelligibility is an Articulation Index (AI). Advantageously the index provides a unit for the estimation.

The audio output means associated with the first zone may comprise one or more audio output devices arranged within the first zone of the interior of the vehicle. Advantageously the audio is output to the first zone.

The one or more audio output devices may be arranged within a headrest of a seat in the first zone. Advantageously, the audio is output close to the occupant's ears.

The control means may be arranged to control the one or more properties of the audio signal to reduce the estimate of the speech intelligibility. Advantageously the speech is masked by the audio signal.

According to an aspect of the invention, there is provided a controller for an in-vehicle privacy system, the controller comprising input means for receiving a speech intelligibility signal indicative of a speech intelligibility in a first zone of an interior of a vehicle, control means arranged to control one or more properties of an audio signal in dependence on the speech intelligibility signal, and output means for causing the audio signal to be output in the first zone to mask speech of a second occupant in a second zone of the interior of the vehicle from a first occupant in the first zone.

A controller as described above, wherein:
the input means comprises an electrical input for receiving the speech intelligibility signal;
the control means comprises a processor arranged to control the one or more properties of an audio signal; and the output means comprises an electrical output for outputting the audio signal.

The input means may be arranged to receive the speech intelligibility signal from an audio input means arranged in the first zone. The control means may be arranged to control the one or more properties of the audio signal in dependence thereon.

The control means is optionally arranged to receive data indicative of one or more parameters of the vehicle and to control the one or more properties of the audio signal in dependence thereon.

The speech intelligibility signal may be indicative of an Articulation Index (AI).

The one or more properties of the audio signal may comprise a frequency profile of the audio signal.

The one or more properties of the audio signal may be controlled to reduce the estimate of the speech intelligibility.

The audio signal may comprise a representation of a noise signal. Optionally the noise signal is one of Brownian, white or pink noise.

According to an aspect of the invention, there is provided a method of masking speech in a vehicle, comprising estimating speech intelligibility in a first zone of an interior of a vehicle, controlling one or more properties of an audio signal in dependence on the estimate of speech intelligibility, and outputting the audio signal in the first zone to mask speech of a second occupant in a second zone of the interior of the vehicle from a first occupant in the first zone.

Estimating the speech intelligibility may comprise receiving an audio signal from the first zone of the interior of the vehicle, and estimating the speech intelligibility in dependence thereon.

The estimating the speech intelligibility may comprise receiving data indicative of one or more parameters of the vehicle and estimating the speech intelligibility in dependence thereon.

The one or more parameters may comprise one or more of vehicle speed, engine speed and motor speed.

The estimate of speech intelligibility may be an Articulation Index (AI).

The one or more properties of the audio signal may be controlled to reduce the estimate of the speech intelligibility.

The controlling one or more properties of the audio signal may comprise controlling a frequency distribution of the audio signal.

The audio signal may comprise a representation of a noise signal. Optionally the noise signal is one of Brownian, white or pink noise.

The audio signal is optionally output to mask speech of a second occupant in a second zone of the interior of the vehicle from a driver of the vehicle.

The method may comprise determining a head position of an occupant. The occupant may be the first occupant in the first zone. The method may comprise determining one or more properties of an audio signal in dependence on the head position. The one or more properties may be a distribution of the audio signal amongst a plurality audio output means. Advantageously the audio may be output according to the head position to improve the masking.

According to an aspect of the invention, there is provided computer software which, when executed by a computer, is arranged to perform a method according to aspect of the invention. The computer software may be stored on a computer readable medium. The computer software may be tangibly stored on a computer readable medium. The computer software may be stored on a non-transitory computer readable medium.

According to an aspect of the invention, there is provided a vehicle comprising an in-vehicle privacy system according to an aspect of the invention, a controller according to an aspect of the invention, arranged to perform a method according to an aspect of the invention or comprising computer software according to an aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
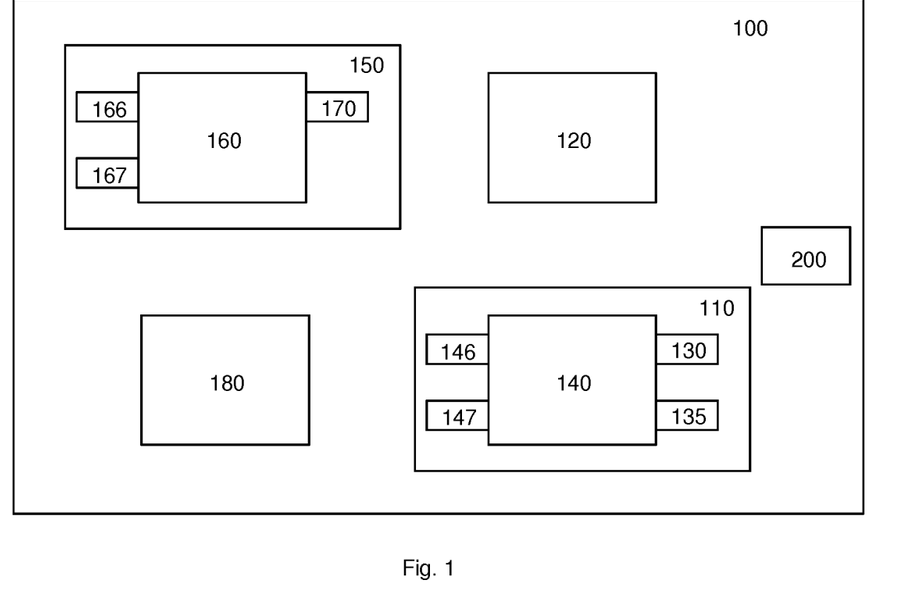
FIG. 1 shows a vehicle according to an embodiment of the invention.

FIG. 1 schematically illustrates a vehicle 100 according to an embodiment of the invention. The vehicle 100 comprises a plurality of seating positions 120, 140, 160, 180. Four seating positions are illustrated, in a two-by-two arrangement, although it will be realised that this is merely an example and that other numbers of seating positions, such as five seating positions, and in other arrangements may be envisaged. Each seating position 120, 140, 160, 180 is associated with a respective seat for an occupant of the vehicle 100.

First and second seats 120, 140 are front seats of the vehicle 100 whilst third and fourth seats 160, 180 are rear seats of the vehicle 100. The second and third seats 140, 160 are shown as being associated each with a respective zone 110, 150 of the vehicle, which may be known as an infotainment zone. Each zone of the vehicle may be a subset or portion of the interior of the vehicle 100. It is desired that audio content within one zone is insulated or contained within that zone. In particular, it is desired that audio content provided within one zone 150 is prevented from being intelligible within another zone 110.

As illustrated in FIG. 1 the vehicle 100 comprises two zones, namely a first zone 110 and second zone 150. The vehicle 100 may comprise other numbers of zones, such as three or four zones. However description will be provided as an example with reference to the two illustrated zones, although the invention is not restricted in this respect. The first zone 110 is associated with a front-seat occupant of the vehicle 100, which may be a driver of the vehicle 100 in a right-hand drive configuration of vehicle 100. The second zone 150 is associated with a rear-seat occupant, hereinafter passenger, of the vehicle 100. In an example where the vehicle 100 is being driven by a driver such as a chauffeur, the rear-seat occupant may take (receive and make) calls whilst travelling in the vehicle 100, although the invention is not limited in this respect. The passenger may take the calls either using a handheld handset or via an in-car hands-free system of the vehicle 100, as will be explained. It is desired to prevent at least speech of the passenger being intelligible to the driver of the vehicle 100. It may also be desirable to prevent speech of another party on the call external to the vehicle 100 being intelligible to the driver. Whilst embodiments of the invention are explained with reference to the passenger and driver of the vehicle, it will be appreciated that the teachings of the invention may be applied between any two occupants of the vehicle in different zones. Furthermore it is desired to prevent speech being intelligible between occupants of different zones 110, 150 without a physical barrier or without excessive noise in the vehicle being generated.

The first zone 110 is associated with audio output means 146, 147. The second zone is associated with audio output means 166, 167. The audio output means 146, 147, 166, 167 are arranged to output audio predominantly to an occupant of each respective zone 110, 150. The audio output means 146, 147 of the first zone 110 is arranged, in use, for outputting different audio to the audio output means 166, 167 of the second zone 150. In some embodiments, the audio output means 146, 147, 166, 167 are arranged within a headrest of each seat 140, 160 to direct output audio toward the seat occupant's ears, thereby aiding audio isolation with each zone 110, 150. However other mounting locations for the audio output means 146, 147, 166, 167 are envisaged such as within the seat body, or within or behind interior trim of the vehicle 100. The audio output means 146, 147, 166, 167 may each be a speaker for outputting audible sounds based on received electrical signals, as will be appreciated.

In some embodiments, the first zone 110 is associated with an audio input means 130. The audio input means 130 is provided for outputting an electrical signal indicative of audio within the first zone 110. The audio input means may be a first microphone 130. The first microphone may be used for determining audible characteristics of the first zone 110. However in other embodiments the microphone 130 may not be included and audible characteristics of the first zone 110 may be inferred, as will be explained. In the illustrated embodiment, the second zone 150 comprises an audio input means 170. The audio input means 170 is provided for outputting an electrical signal indicative of audio within the second zone 150. The audio input means may be a second microphone 170. The second microphone 170 may be used for facilitating a telephone call with the passenger within the second zone 150. In some embodiments the second microphone is used to determine one or more characteristics of speech within the second zone 150. The one or more characteristics may be a frequency profile and a volume of the speech within the second zone 150.

In some embodiments, a head position determination means 135 is provided in relation to at least one seating position. In the example shown in FIG. 1 a head position determination means 135 is provided in relation to the second seating position 140 for determining a position of the head of the occupant of the first zone 110, as will be explained. The head position determination means 135 may be one or more cameras or imaging devices arranged within the vehicle 100. In the example embodiment shown in FIG. 1, the one or more cameras are arranged to provide image data corresponding to an image of one or more occupants from whom the system is arranged to mask speech within the vehicle, which in the example of FIG. 1 is the occupant of the first zone 110.

The vehicle 100 further comprises a control means 200 which may be in the form of a controller 200. The control means 200 may be communicably coupled to the first microphone 130 and/or audio output means 146, 147. In some embodiments the control means 200 is communicably coupled to the head position determination means 135, as will be explained. Some embodiments may comprise alternative or additional communicable connections with the control means 200 as will be explained.

Figure 2:
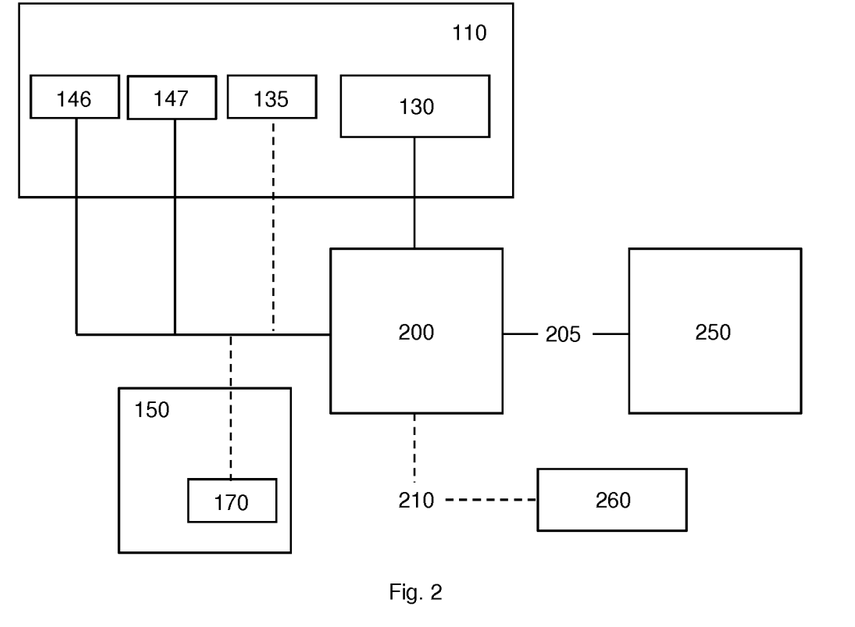
FIG. 2 shows an illustration of a system according to an embodiment of the invention.

FIG. 2 illustrates a system according to an embodiment of the invention. The system 200 comprises a control means 200 in the form of a controller 200 according to an embodiment of the invention. The controller is an in-vehicle privacy controller 200 according to an embodiment of the invention. The controller 200 is arranged to render unintelligible, at least partly, speech within the vehicle 100 outside of one or more zones within the vehicle 100 which the controller 200 is associated.

The controller 200 may be implemented as an electronic device comprising one or more processors operable to execute computer software instructions which may be stored in a memory accessible to the one or more processors, such as a memory device of the controller 200. The controller 200 may be communicably coupled to a communication bus 210 of the vehicle 100 to exchange, i.e. to send and/or receive data, with other units or modules communicably coupled with the communication bus 210. The communication bus 210 may be implemented by, for example, a communication network such as one of CANBus, Ethernet or Flexray, although other bus protocols may be envisaged. In some embodiments, the controller 200 obtains vehicle information via the communication bus 210 from a vehicle system 260 indicative of one or more characteristics of the vehicle 100, such as speed and/or engine or motor speed i.e. in revolutions per minute (RPM).

The system further comprises audio output means 146, 147 associated with at least one zone which, in the illustrated embodiment, is the first zone 110. It will be appreciated that the controller 200 may be associated with audio output means of more than one zone. The controller 200 is arranged to, in use, cause the audio output means 146, 147 to output audible signals having one or more characteristics targeted to render speech outside the first zone 100 at least partly unintelligible. The controller 200 comprises an output means, which may be in the form of an electrical output, to the audio output means 146, 147, which may each be a speaker.

In some embodiments, as noted above, the system further comprises first audio input means 130 for providing a signal to the controller 200 indicative of audible signals in the first zone 110. The audio input means 130 may be a microphone located within the first zone 110. The controller 200 comprises an input means, such as an electrical input, for receiving an electrical signal from the microphone 130.

The system further comprises audio source means 250 for providing an audio signal 205. The audio source means is coupled to the controller 200 by an electrical input of the controller for receiving the audio signal 205. In some embodiments the audio source means 250 comprises a source of noise. The source of noise may be one of a source of Brownian, white or pink noise. The audio source means 250 may be an audio source device for providing the audio signal 205 to the controller. In other embodiments, the audio signal 205 is received from source of audio, which may be provided from one or a combination of a music source, a radio or a streaming audio source. The source of audio may be an entertainment system of the vehicle which is capable of receiving radio, digitally streamed music or audio (such as audiobooks), such as over the Internet, or reproducing stored audio for example from a CD, DVD, memory device or other storage medium.

As noted above, in some embodiments the system comprises the head position determination means 135 for determining the position of the head of the occupant of the first zone 110. As noted above, the occupant of the first zone 110 may be a driver of the vehicle 100 in the example shown in FIG. 1.

Furthermore, in some embodiments the system comprises second audio input means 170 located in the second zone 150. The second audio input means 130 may provide a signal to the controller 200 indicative of one or more characteristics of an occupant in the second zone 150 i.e. the passenger of the vehicle 100.

Figure 3:
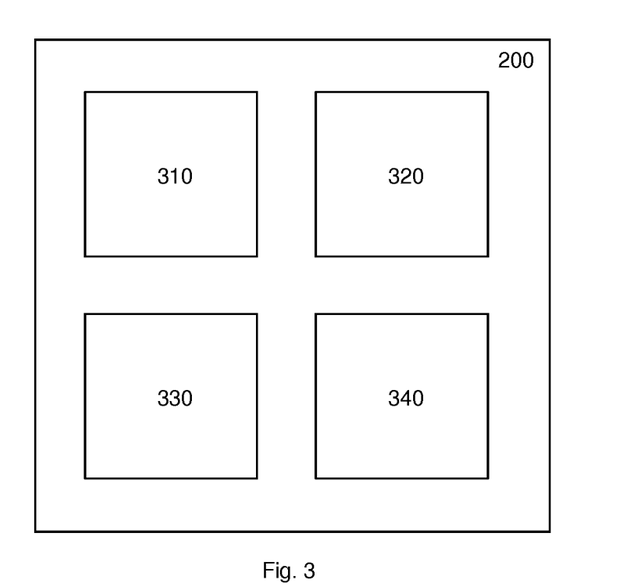
FIG. 3 shows an illustration of a controller according to an embodiment of the invention.

FIG. 3 illustrates modules which operatively execute on the controller 200 according to an embodiment of the invention. The modules may be implemented as software which is executed by the one or more processing means of the controller 200.

A Speech Intelligibility Module (SIM) 310 is provided for estimating speech intelligibility in one or more zones of the vehicle 100. In particular, in the example of FIG. 1, the SIM 310 is arranged to estimate the intelligibility of speech within the first zone 110. The speech may be that of an occupant within another zone of the vehicle, such as the second zone 150 in the example of FIG. 1. That is, the SIM 310 operably determines whether speech of the occupant in the second zone 150 is intelligible within the first zone 110. The SIM 310 in one embodiment receives the signal from the microphone 130 for determining audio characteristics within the first zone 110. In some embodiments the SIM 310 may alternatively or additionally receive the vehicle information such as speed, engine or motor speed to estimate the intelligibility of speech within the first zone 110.

A Masking Module (MM) 320 is provided for operatively controlling one or more properties of an output audio signal. The MM 320 is arranged to control the one or more properties in dependence on the estimate of speech intelligibility provided from the SIM 310. The output audio signal is controlled to mask, from a first occupant in the first zone 110 of the interior of the vehicle 100, speech of a second occupant in the second zone 150 of the interior of the vehicle 100. The audio signal of which the properties are controlled by the MM 320 is the audio signal 205 provided from the audio source 250. The output audio signal is provided to the audio output means 146, 147 associated with the first zone 110.

Returning to the SIM 310, in some embodiments the SIM 310 receives the signal from the microphone 130 indicative of sound within the first zone 110. The SIM 310 is arranged to estimate the speech intelligibility in the first zone 110 in dependence thereon. The estimate of speech intelligibility may be an Articulation Index (AI). The AI is an acoustical index which is used to estimate or predict a speech recognition ability of a person listening to speech. The SIM 310 may determine the AI based on the signal from the microphone 130. The SIM 310 operates by dividing a predetermined frequency spectrum into a plurality of bands, such as 20 bands although other numbers of bands may be used. The bands may range between first and second upper and lower frequency limits, such as 200 and 6300 Hz, although it will be appreciated that other limits may be used.

The AI may be calculated as:

$$AI = \sum_{i=1}^{n} W_i \left[ \frac{(SNR_i + n)}{30} \right]$$

Where $W_i$ is a weight given to each frequency band indicative of the importance of that band to speech recognition, $SNR_i$ is a speech-to-noise ratio in band i, which may be determined as a difference between a root-mean-square (rms) speech level and an rms noise level and n is a predetermined value to represent a peak speech level, which may be a value of 12. It will be noted that $W_i$ does not have to be equal for all bands and that a different value of $W_i$ may be used for each band. In particular, in order that the determined AI is reflective of how intelligible the speech of the occupant of the second zone 150 is, the weighting of frequency bands corresponding to those of the occupant's voice may be increased by the SIM 310 in dependence on the signal from the second audio input means 170 of the second zone 150 such that frequency bands having a larger signal, due to speech in the second zone 150 have an increased weight.

It can be appreciated that the bracketed quantity in the above equation ranges in value from 0 to 1 and, if 20 bands are used, each band may have a weighting of 0.05, such that AI is determined as a value between 0 and 1 although it will be appreciated that other numbers of bands and weightings may be used resulting in other upper and lower limit values.

In other embodiments, as noted above, the SIM 310 may receive data indicative of one or more characteristics of the vehicle 100 from the vehicle system 260. For example, the SIM 310 may receive speed data or engine RPM data via the communication bus 210. Based on predetermined characteristics of the vehicle 100, the SIM 310 may, in some embodiments, estimate the speech intelligibility in dependence on the data indicative of one or more characteristics of the vehicle 100. For example, the AI may be determined to decrease within increasing vehicle speed and/or engine speed.

The SIM 310 is arranged to compare the determined AI with a predetermined AI threshold. If the AI is above the threshold, then speech is determined to be intelligible to the occupant of the first zone 110. The threshold may be a value of 0.3, although it will be appreciated that this is merely an example and that other threshold values may be used.

If the determined AI is above the AI threshold, a signal may be provided to the MM 320 to provide output audio to the first zone 110 for masking the speech, thereby reducing the AI of the first zone 110. The audio is output by the audio output means 146, 147 associated with the first zone 110. The audio is provided to the MM 320 from the audio source means 250 as the audio signal 205. The audio signal 205 may be representative of Brownian, white or pink noise in some embodiments. In other embodiments, the audio source means is one of a music source, a radio or a streaming audio source.

The output audio has one or more characteristics controlled by the MM 320 to mask the speech. In some embodiments the one or more characteristics comprise a frequency profile of the audio signal. The MM 320 may comprise a filter or a series of filters each having a predetermined bandpass, such that the frequency profile of the audio can be controlled by the MM 320. The MM 320 may control the filters to increase a volume of audio output in the first zone 110 in one or more frequency bands relative to the volume of audio output in other frequency bands to mask the speech in the second zone 150.

In some embodiments, the controller 200 executes one or both of a speech determination module (SDM) 330 and a head position module (HPM) 340.

The SDM 330 is arranged to determine one or more speech characteristics of an occupant in the vehicle 100. In particular, in the example embodiment, the SDM 330 is arranged to determine one or more frequency bands in which the occupant of the second zone 150 is speaking. For example if the occupant of the second zone is a young female, it will be expected that their speech occupies one or more relatively higher frequency bands than, for example, an older male. In one embodiment, the SDM 330 is able to access data indicative of occupant characteristics such as sex and age. However in other embodiments the SDM 330 is operative to receive the signal from the audio input means 170 of the second zone 150 to determine the frequency characteristics of the occupant of the second zone's voice based thereon. The SDM 330 may provide data indicative of frequency band weightings to one or both of the SIM 310 and the MM 320. The SIM 310 may determine the value of $W_i$ for each frequency band based thereon. The MM 320 may control the frequency characteristics of the output audio in the first zone 110, such as by varying the plurality of filters operative on the audio signal 205, in order to target output audio in the frequency bands corresponding to the speech in the second zone 150, relative to the volume of audio output in other frequency bands. In this way, output audio in the first zone 110 is targeted by the MM 320 to frequency bands corresponding to the speech of the occupant in the second zone 150.

In some embodiments, the HPM 340 is arranged to receive the image data from the head position determination means 135 which, as noted above, may be one or more cameras or imaging devices arranged within the vehicle 100. The HPM 340 is arranged to operatively determine the position of a head of at least one occupant of the vehicle. In the example of FIG. 1, the HPM 340 is arranged to receive image data corresponding to an image of the occupant of the first zone. The HPM 340 is arranged to determine the position of the occupant's head from the received image data. In particular, in some embodiments, the HPM 340 is arranged to determine the position of the occupant's head relative to the plurality of audio output means 146, 147 with the zone of the occupant, namely the first zone 110 in the example. The HPM 340 determines the position of the occupant's head with respect to each of the plurality of audio output means 146, 147. For example, where first and second audio output means 146, 147 are arranged in each side of the headrest of the seat in the first zone 110, the HPM 340 determines whether the head is biased toward one side or the other to determine a relative proximity to each of the audio output means 146, 147. Data indicative of the position is provided from the HPM 340 to the MM 320. The MM 320 in some embodiments controls a volume of the audio signal provided to each audio output means 146, 147 in order to balance the audio amplitude at each ear of the occupant. In this way, relatively equal masking audio is provided to the occupant of the first zone 110 even when their head is tilted. It will be appreciated that the HMP 340 and the MM 320 may control the volume of audio provided to other audio output means within the first zone in addition, or alternatively to, those mounted within the headrest.

Figure 4:
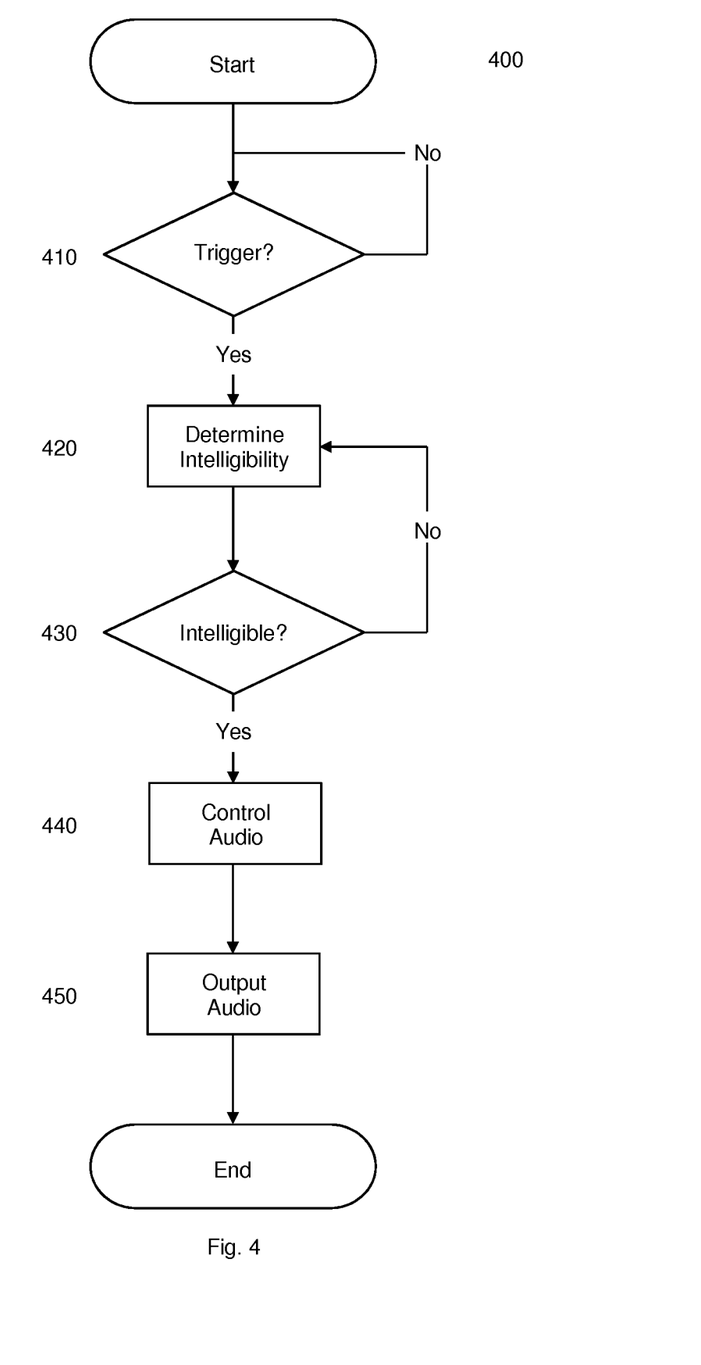
FIG. 4 shows a method according to an embodiment of the invention.

FIG. 4 illustrates a method 400 according to an embodiment of the invention. The method 400 is a method of masking speech in a vehicle according to an embodiment of the invention. The method 400 may be performed by a processing device, such as the controller 200 described above.

The method 400 comprises a step 410 of determining whether a trigger event has occurred. The trigger may be receiving a user input indicative of a request for the method 400 to be performed. The user input may be provided by an occupant of the vehicle, such as the occupant of the second zone 150 in particular, although not exclusively. The input is indicative of a desire that speech within the vehicle 100 should be masked. The user input may be provided to a switching device within the vehicle 100, or to a graphical user interface GUI such as via a user-selectable control of the GUI. In other embodiments, the trigger may be a telephone call being received at the vehicle 100, such as via a hands-free system of the vehicle. If no trigger is received, the method waits in step 410 i.e. loops, until a trigger is received when the method proceeds to step 420.

In step 420 the method 400 determines an estimate of speech intelligibility. The estimate may be determined as described above with reference to the SIM 310. In particular, the estimate may be determined as the AI of speech in a zone of the interior of the vehicle 100, such as the first zone 110. The speech may be from an occupant of another zone of the vehicle, such as the second zone 150.

In step 430 it is determined whether speech is intelligible. The determination in step 430 is made with reference to the estimate determined in step 420. In particular, the estimate of speech intelligibility determined in step 420 is compared against an intelligibility threshold. In one embodiment, the value of AI determined in step 420 is compared against an AI threshold in step 430. The AI threshold may, for example, be 0.3. If the determined AI exceeds the AI threshold then speech is determined to be intelligible and the method moves to step 440. If the speech is not determined to be intelligible, such as the determined AI being below the threshold, then the method returns to step 420, where the AI is again determined. A delay may be included before re-determination of the AI. For example, the delay may be a value of 10 seconds, 30 second, or 1 minute, although other delay values may be used.

In step 440 one or more properties of an audio signal are determined for masking the speech. The one or more properties comprise, in some embodiments, a frequency distribution of the audio signal. The frequency distribution may be controlled such that the audio signal comprises a greater signal i.e. is louder in one or more frequency bands. The frequency bands in which the signal is controlled to have a greater amplitude may comprise those bands corresponding to the occupant's voice.

In step 450 the audio signal is output. The audio signal is provided to one or more audio output means 146, 147.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An in-vehicle privacy system, comprising:
one or more audio output devices associated with a first zone of an interior of a vehicle;
an audio signal generator device for providing an audio signal to the audio output devices;
a speech intelligibility processor for estimating a speech intelligibility in the first zone; and
a controller arranged to control one or more properties of the audio signal based on the estimate of speech intelligibility to mask speech of a second occupant in a second zone of the interior of the vehicle from a first occupant with the first zone;
wherein the speech intelligibility processor is arranged to receive data indicative of one or more parameters of the vehicle and to estimate the speech intelligibility based thereon; and
wherein one or both of:
the one or more properties of the audio signal comprise a frequency profile of the audio signal; and
the controller is arranged to control the one or more properties of the audio signal to reduce the estimate of the speech intelligibility.

2. The system of claim 1, wherein the audio signal generator device comprises a source of noise, wherein the source of noise is one of a source of Brownian, white, or pink noise.

3. The system of claim 1, wherein the audio signal generator device comprises a source of audio; optionally the audio is provided from one of a music source, a radio or a streaming source.

4. The system of claim 1, wherein the speech intelligibility processor is arranged to receive a signal from an audio input device arranged in the first zone and to estimate the speech intelligibility in dependence thereon.

5. The system of claim 1, wherein the one or more parameters comprise one or more of vehicle speed, engine speed and motor speed.

6. The system of claim 1, further comprising:
a plurality of audio output devices associated with a first zone; and
one or more cameras or imaging devices for determining a head position of the first occupant and outputting data indicative of the head position;
wherein the controller is arranged to provide the audio signal to the plurality of audio output devices based thereon.

7. The system of claim 1, wherein the one or more audio output devices are arranged within a headrest of a seat in the first zone.

8. A controller for an in-vehicle privacy system, the controller comprising:
an electrical input for receiving a speech intelligibility signal indicative of a speech intelligibility in a first zone of an interior of a vehicle;
a processor arranged to control one or more properties of an audio signal based on the speech intelligibility signal; and
an electrical output for outputting the audio signal in the first zone to mask speech of a second occupant in a second zone of the interior of the vehicle from a first occupant in the first zone;
wherein the processor is arranged to receive data indicative of one or more parameters of the vehicle and to control the one or more properties of the audio signal based thereon; and
wherein one or both of:
the one or more properties of the audio signal comprise a frequency profile of the audio signal; and
the one or more properties of the audio signal are controlled to reduce the estimate of the speech intelligibility.

9. The controller of claim 8, wherein the electrical input is arranged to receive the speech intelligibility signal from an audio input device arranged in the first zone, and the processor is arranged to control the one or more properties of the audio signal in dependence thereon.

10. The controller of claim 8, wherein the audio signal comprises a representation of a noise signal; optionally the noise signal is one of Brownian, white or pink noise.

11. A controller according to claim 8 comprised in a vehicle.

12. A method of masking speech in a vehicle, comprising:
estimating speech intelligibility in a first zone of an interior of a vehicle;
controlling one or more properties of an audio signal based on the estimate of speech intelligibility; and
outputting the audio signal in the first zone to mask speech of a second occupant in a second zone of the interior of the vehicle from a first occupant in the first zone;
wherein the estimating the speech intelligibility comprises receiving data indicative of one or more parameters of the vehicle and estimating the speech intelligibility based thereon; and
wherein one or both of the one or more properties of the audio signal are controlled to reduce the estimate of the speech intelligibility; and
the controlling one or more properties of the audio signal comprises controlling a frequency distribution of the audio signal.

13. The method of claim 12, wherein the estimating the speech intelligibility comprises receiving an audio signal from the first zone of the interior of the vehicle, and estimating the speech intelligibility based thereon.

14. The method of claim 12, wherein the one or more parameters comprise one or more of vehicle speed, engine speed and motor speed.

15. The method of claim 12 wherein the audio signal comprises a representation of a noise signal, wherein the noise signal is one of Brownian, white, or pink noise.

16. The method of claim 12, wherein the audio signal is output to mask speech of a second occupant in a second zone of the interior of the vehicle from a driver of the vehicle.

17. A method according to claim 12 comprised in computer software, wherein the computer software is stored on a computer readable medium.

* * * * *